US010826831B2

(12) United States Patent
Mishra et al.

(10) Patent No.: US 10,826,831 B2
(45) Date of Patent: Nov. 3, 2020

(54) DYNAMIC PROTOCOL INDEPENDENT MULTICAST LOAD BALANCING

(71) Applicant: Cisco Technology, Inc., San Jose, CA (US)

(72) Inventors: Mankamana Mishra, Dublin, CA (US); Jayashree Subramanian, Cary, NC (US); Stig Venaas, Oakland, CA (US); Nitin Kumar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/992,413

(22) Filed: May 30, 2018

(65) Prior Publication Data

US 2019/0372898 A1 Dec. 5, 2019

(51) Int. Cl.
*H04L 12/803* (2013.01)
*H04L 12/761* (2013.01)

(52) U.S. Cl.
CPC ............ *H04L 47/125* (2013.01); *H04L 45/16* (2013.01)

(58) Field of Classification Search
CPC .................................. H04L 45/16; H04L 47/125
See application file for complete search history.

(56) References Cited

U.S. PATENT DOCUMENTS

| 7,719,958 | B1 | 5/2010 | Azimi et al. |
| 9,231,821 | B2 | 1/2016 | Arumugam et al. |
| 2009/0116393 | A1* | 5/2009 | Hughes .................. H04L 45/122 370/238 |
| 2010/0214913 | A1* | 8/2010 | Kompella ............. H04L 45/125 370/230 |
| 2012/0294308 | A1 | 11/2012 | Cai et al. |
| 2015/0188722 | A1 | 7/2015 | Bhagavathiperumal et al. |
| 2018/0054391 | A1* | 2/2018 | Jain ..................... H04L 47/2458 |

OTHER PUBLICATIONS

S. Previdi, ED., et al., "IS-IS Traffic Engineering (TE) Metric Extensions", Internet Engineering Task Force (IETF), ISSN: 2070-1721, May 2016, 18 pgs.
Yiqun. Cai, et al., "PIM Designated Router Load Balancing", draft-ietf-pim-drlb-07, Network Working Group, Internet-Draft, Jan. 16, 2018, 18 pgs.
Unknown Author, "Bandwidth-Based Call Admission Control for IP Multicast", Ip Multicast Optimization Features Bookmap Cisco IOS XE Release 3SG, 12 pgs.
Fenner, B. et al., "Protocol Independent Multicast—Sparse Mode (PIM-SM): Protocol Specification (Revised)", Network Working Group, Feb. 2006, 112 pages.

* cited by examiner

*Primary Examiner* — Kodzovi Acolatse
*Assistant Examiner* — Farhad Ali
(74) *Attorney, Agent, or Firm* — Edell, Shapiro & Finnan, LLC

(57) ABSTRACT

A method including receiving, at a first router of a plurality of routers, a first message from the plurality of routers. The first message includes a designated router priority and a weight for each respective router. Based on the designated router priorities, a designated router is elected and a one or more eligible group designated routers are determined. The method determines whether the first router is the designated router or the at least one eligible group designated router. If the first router is the designated router, the first router provides a second message to the remaining routers indicating the eligible group designated routers and their weights.

20 Claims, 5 Drawing Sheets

DYNAMIC PROTOCOL INDEPENDENT MULTICAST LOAD BALANCING

TECHNICAL FIELD

The present disclosure relates to load balancing multicast network traffic.

BACKGROUND

In a multi-access network, a plurality of protocol independent multicast (PIM) routers receive multicast network traffic from multicast sources. On a last hop, one of the PIM routers is elected as a designated router. The designated router may keep track of local multicast listeners and/or receivers. The designated router is responsible for forwarding multicast network traffic flows to one or more hosts or endpoints which requested the network traffic if the plurality of PIM routers is operating PIM Sparse Mode (PIM-SM).

DESCRIPTION OF EXAMPLE EMBODIMENTS

Overview

Broadly, this disclosure is directed to performing weighted load balancing using at least one eligible group designated router. A first router in a plurality of routers may receive a first message from each of the other routers. The first message may include a designated router priority as well as a weight for each respective router. The weight may indicate a capacity of a respective router to forward multicast network traffic. Based on the designated router priorities, each router may determine, or elect, a designated router and at least one eligible group designated router. The designated router forwards multicast network traffic to at least one host or endpoint. When fit is determined that the first router is the designated router, the first router provides a second message to the other routers. The second message identifies the at least one eligible group designated router as well as the weight for each of the eligible group designated routers. However, if the first router is an eligible group designated router, the first router may receive a third message from the designated router. The third message identifies the eligible group designated routers as well as the weight for each of the eligible group designated routers. The first router may then route a number of multicast network traffic flows. The number of multicast network traffic flows may depend on the weight of the first router.

EXAMPLE EMBODIMENTS

Figure 1:
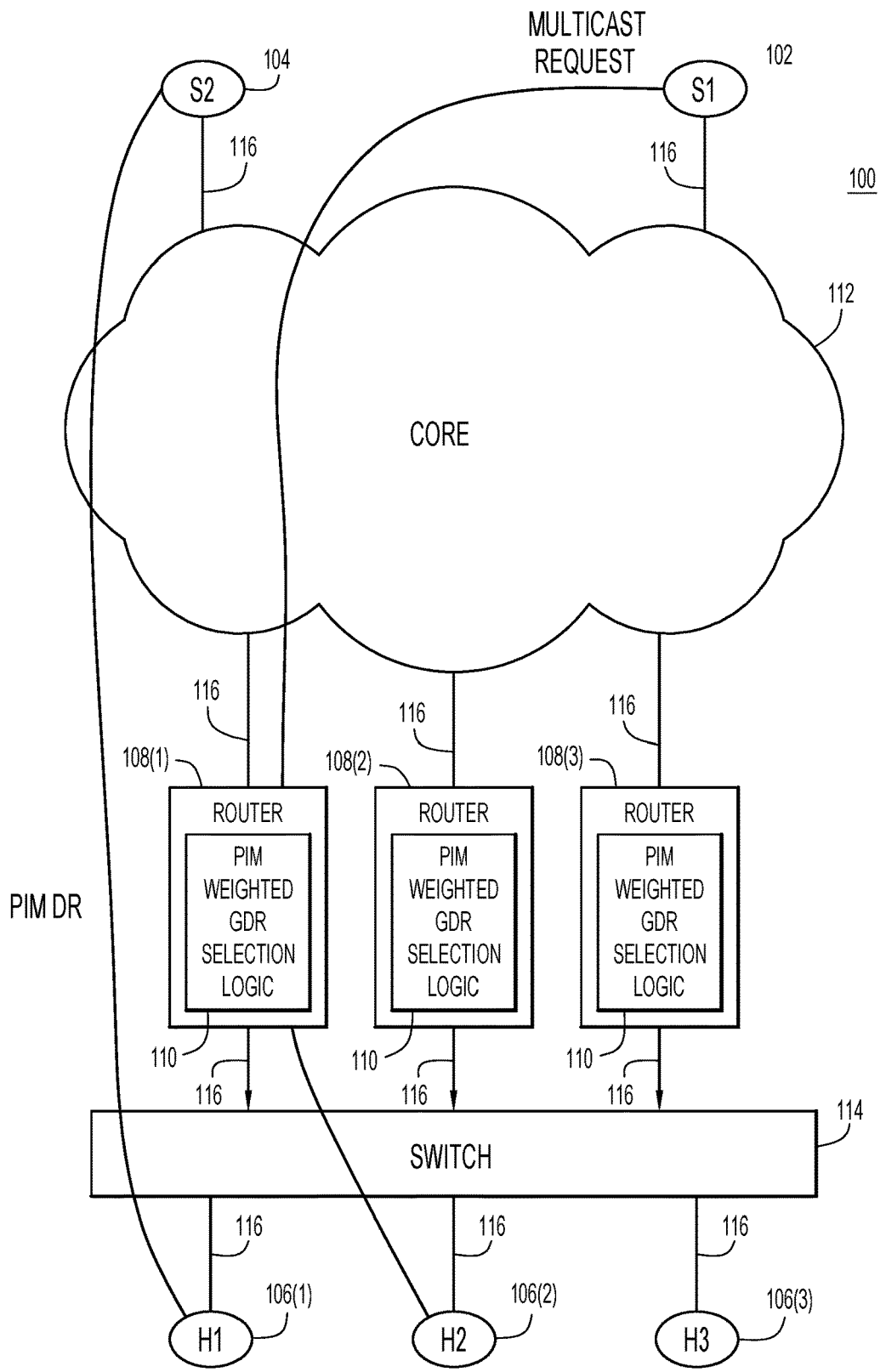
FIG. 1 shows a computer network that load balances multicast network traffic flows using a plurality of PIM routers, according to an example embodiment.

With reference to FIG. 1, a computer network 100 is shown in which multicast network traffic flows are load balanced using a plurality of routers, according to an example embodiment. The computer network 100 may be a multi-access network that includes a multicast source 102 denoted S1, a unicast source 104 denoted S2, and three hosts 106(1), 106(2), 106(3) also denoted H1, H2 and H3, respectively. The computer network 100 may also include a plurality of routers 108(1), 108(2), 108(3). Each of the routers 108(1)-108(3) may execute or perform Protocol independent Multicast (PIM) weighted group designated router selection logic 110, as described in more detail herein. Each of the routers 108(1)-108(3) may be in communication with the multicast source 102 and the unicast source 104 via a core network 112. The network 112 may be any suitable computer network, such as a wide area network (WAN), a local area network (LAN), etc. Moreover, each of the routers 108(1)-108(3) may be in communication with the hosts 106(1)-106(3) via a switch 114. Network links 116 may enable the multicast source 102, unicast source 104, hosts 106(1)-106(3), routers 108(1)-108(3), network 112, and switch 114 to communicate with each other. The network links 116 may be wired, wireless, or a combination of wired and wireless links. One of ordinary skill in the art should appreciate that any number of multicast sources, unicast sources, routers, switches, and hosts may be used.

The multicast source 102, unicast source 104, and hosts 106(1)-106(3) may be any computing device, such as a personal computer, a mobile phone, a virtual desktop application running on a server, a server, etc.

One or more of the hosts 106(1)-106(3) may request content from the multicast source 102 and the unicast source 104, for example. Generally, one of the routers 108(1)-108(3) is elected as a designated router. The designated router is responsible for routing all multicast network traffic flows from the multicast source 102 to the hosts 106(1)-106(3). However, such a configuration may result in an inefficient use of network resources. For example, the router 108(1) may be elected as the designated router (DR). Network traffic from unicast source 104 to host 106(1) may use most or all of the bandwidth available to router 108(1). Any multicast network traffic from multicast source 102 to hosts 106(2) and/or 106(3) may not be delivered with a sufficient quality. Rather, the multicast network traffic may be delivered with a best effort. In some scenarios, the unicast traffic may also be affected and delivered with a best effort as well. However, routers 108(2) and 108(3) may not be using any bandwidth. But, because routers 108(2) and 108(3) were not elected as the designated router, routers 108(2) and 108(3) cannot participate in routing multicast network traffic flows. Therefore, there may be significant inefficiencies in utilizing network resources.

In other implementations, such as that described in PIM Designated Router Load Balancing IETF draft (located at https://tools.ietforg/html/draft-ietf-pim-drib-07), which is incorporated herein in its entirety, multicast network traffic may be load balanced among eligible group designated routers. Eligible group designated routers include routers that are elected as the designated router as well as routers that are not elected as the designated router but are capable of routing multicast network traffic flows. Continuing the example from above, multicast network traffic may be load balanced among routers 108(1)-108(3). However, in such implementations, the load balancing is based on static attributes of elements of the computer network 100, such as the source Internet Protocol (IP) address of the multicast source 102, a multicast group IP address, a Rendezvous Point IP address, etc. In such implementations, the load balancing is unable to dynamically adapt to changing network conditions.

Figure 2:
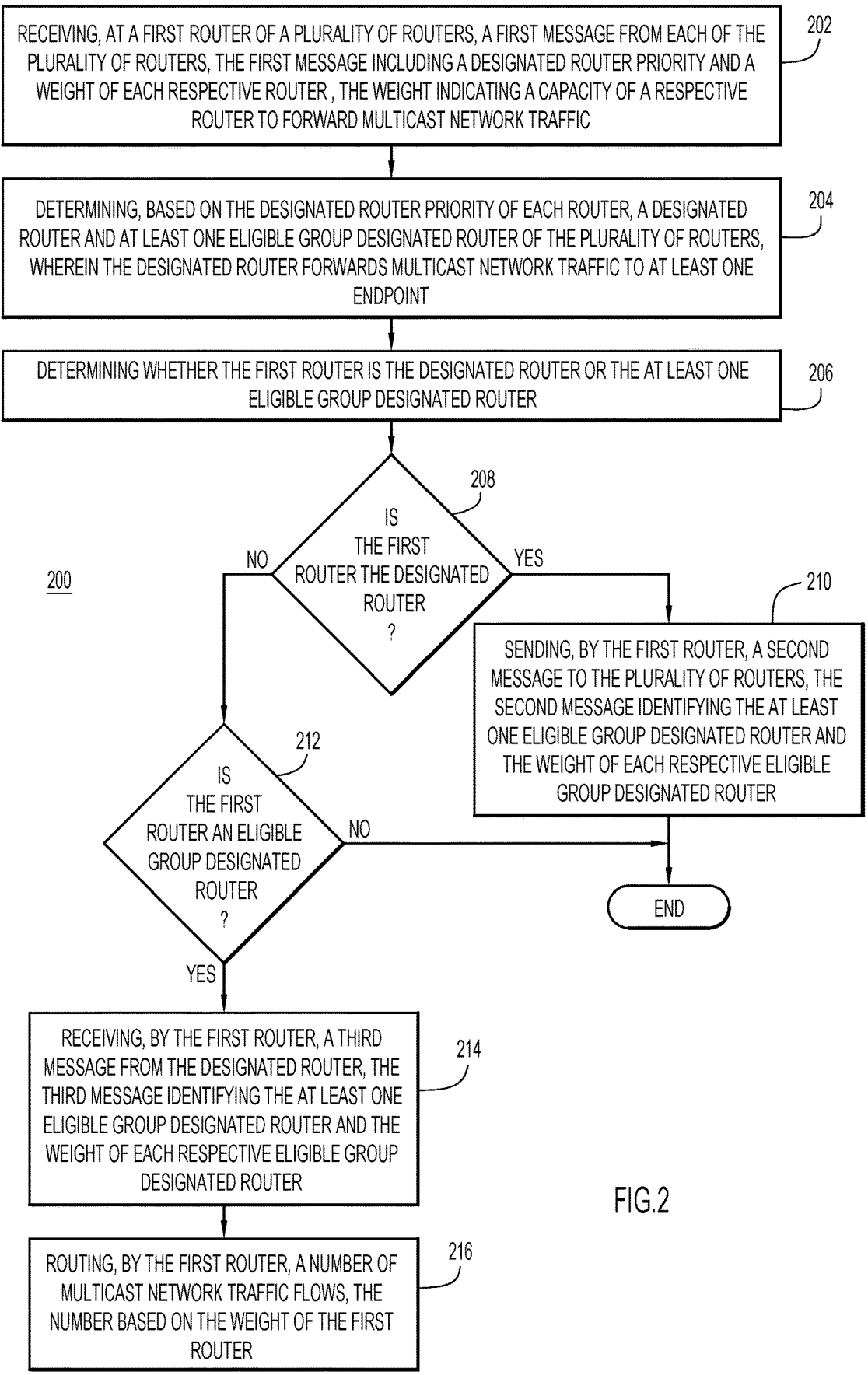
FIG. 2 is a flowchart depicting a method involving PIM weighted group designated router selection for load balancing multicast network traffic, according to an example embodiment.

Turning next to FIG. 2, and with continuing reference to FIG. 1, shown is a flow diagram depicting a method 200 performed by the PIM weighted group designated router selection logic 110 for dynamically load balancing multicast network traffic using a plurality of routers, according to an example embodiment.

At operation 202, a first router of a plurality of routers receives a first message from each of the other plurality of routers. For example, router 108(1) may receive the first message from each of routers 108(2) and 108(3), router 108(2) may receive the first message from routers 108(1) and 108(3), and router 108(3) may receive the first message from routers 108(1) and 108(3). The first message may include a designated router priority and a weight for each respective router. The designated router priority may be used to elect the designated router, as described in more detail below. The weight for each respective router may indicate a capacity of each respective router to forward multicast network traffic in the event that the router is an eligible group designated router, as described in more detail below.

The weight for each router may be a one byte value, for example. In this embodiment, the value of the weight may range from 0-255. A router may determine its weight based on one or more attributes. For example, the attributes may include a current load on a link between a router and the switch 114, a current load on a router, or a user-controlled policy. The current load on the link may include unicast, multicast, and/or broadcast network traffic flows. The current load on the router may include the load on the router processor, memory, or any other hardware. The user-controlled policy may be used to dynamically apply policies which may dynamically change the weight of the router. The weight may also a link speed for the router, where a greater link speed may correspond to a greater weight. As network conditions change, the weight of a router may change to reflect the changed network conditions.

In another example embodiment, values for the weight may have a special value. For example, a value of zero may indicate that a router is eligible to be the designated router but does not wish to participate in any multicast network traffic flows. For example, a first router may have a link speed of 1 Gbps while second and third routers may have a link speed of 100 Gbps. Because the second and third routers have a much greater link speed than the first router, the first router may defer forwarding multicast network traffic flows to the second and third routers. When network conditions change sufficiently, the first router may begin to participate in the multicast network traffic flows as well.

In one example embodiment, the first message may be a PIM hello message. The PIM hello message may include a PIM designated router weighted load balancing capability (DRWLBC) option. The DRWLBC option may include the weight of the router that provided the PIM hello message. The DRWLBC option may also include an algorithm type value, which may indicate whether the router that provided the PIM hello message supports the weighted PIM designated router load balancing techniques of this disclosure.

At operation 204, each router determines, or elects, a designated router and at least one eligible group designated router. The designated router is elected based on the designated router priority of each router, as received in the first message at operation 202. The router with the highest designated router priority may be elected as the designated router. If there is a tie based on the designated router priorities, a tiebreaking mechanism may be used to determine the designated router. For example, the tiebreaking mechanism may compare the IP addresses for the tied routers. The router with the highest IP address may be elected as the designated router. For example, routers 108(1) and 108(2) may have a designated router priority of 100 while router 108(3) may have a designated router priority of 85. Because routers 108(1) and 108(2) have the same, higher designated router priority, the IP addresses for routers 108(1) and 108(2) may be compared. Whichever router has the higher IP address is elected the designated router. For exemplary purposes only, router 108(1) is the designated router.

In addition to determining the designated router, each router may also determine a list of eligible group designated routers. As described above, eligible group designated routers include the designated router and routers that are not elected as the designated router but are capable of forwarding multicast network traffic as part of a dynamic, weighted load balancing technique. The group designated routers are determined based on the designated router priority. For example, routers that have the same designated router priority as the elected designated router may be the group designated routers. Continuing the example from above, routers 108(1) and 108(2) have the same designated router priority and router 108(1) was elected as the designated router. Because router 108(2) has the same designated router priority as the designated router but was not elected as the designated router, router 108(2) may be an eligible group designated router. Additionally, since router 108(1) was elected as the designated router, router 108(1) is also an eligible group designated router. However, because router 108(3) has a designated router priority that is less than the designated router priority of the elected designated router, router 108(3) cannot be an eligible group designated router.

At operation 206, the first router determines whether it is the designated router, the at least one eligible group designated router, or neither the designated router nor the at least one eligible group designated router.

At operation 208, in response to determining that the first router is the designated router, the method 200 may proceed to operation 210. However, in response to determining that the first router is not the designated router, then the method 200 may proceed to operation 212.

At operation 210, in response to determining that the first router is the designated router, the first router sends a second message to the other plurality of routers. The second message includes a list of eligible group designated routers and their associated weights. In one example embodiment, the second message is a second PIM hello message. The second PIM hello message may include a PIM designated router weighted load balancing group designated router hello option (DRWLBGDR). The designated router may provide the second PIM hello message with the DRWLBGDR option to notify other routers which routers are eligible group designated routers. For example, router 108(1) may provide the second PIM hello message with the DRWLBGDR option to router 108(2), which is an eligible group designated router. The list of eligible group designated routers may carry a weight for each eligible group designated router, which may be used to determine a number of multicast network traffic flows routed by each eligible group designated router, as described in more detail herein.

At operation 212, the first router determines if it is the at least one eligible group designated router. If it is not the at least one eligible group designated router, then the method 200 ends because the first router is neither the designated router nor the at least one eligible group designated router. Routers that are not the designated router nor the at least one eligible group designated router do not participate in routing multicast network traffic flows. However, in response to determining that the first router is the at least one eligible group designated router, the method 200 proceeds to operation 214.

At operation 214, in response to determining that the first router is the at least one eligible group designated router, the first router may receive, from the designated router, a third message. The third message may identify the at least one eligible group designated router as well as the weight for each eligible group designated router. In one example embodiment, the third message may be a third PIM hello message with the DRWLBGDR option as described above. Continuing the example above, router 108(2) may receive the third PIM hello message with the DRWLBGDR option from router 108(1).

At operation 216, the first router routes a number of multicast network traffic flows to one or more hosts 106(1)-106(3). For example, the number of multicast network traffic flows may depend on the weight of the first router. The greater the weight of the first router, the more multicast network traffic flows the first router may route. In another example embodiment, the first router may perform a hash function, including the respective weight of the first router, to determine the number of network traffic flows the first router routes.

These techniques provide a system and method for efficiently using available network resources. This enables multicast network traffic to be load balanced among a plurality of eligible group designated routers based on a weight of each group designated router. The weight of each group designated router may change as network conditions change. Therefore, these techniques dynamically load balance multicast network traffic flows.

Figure 3:
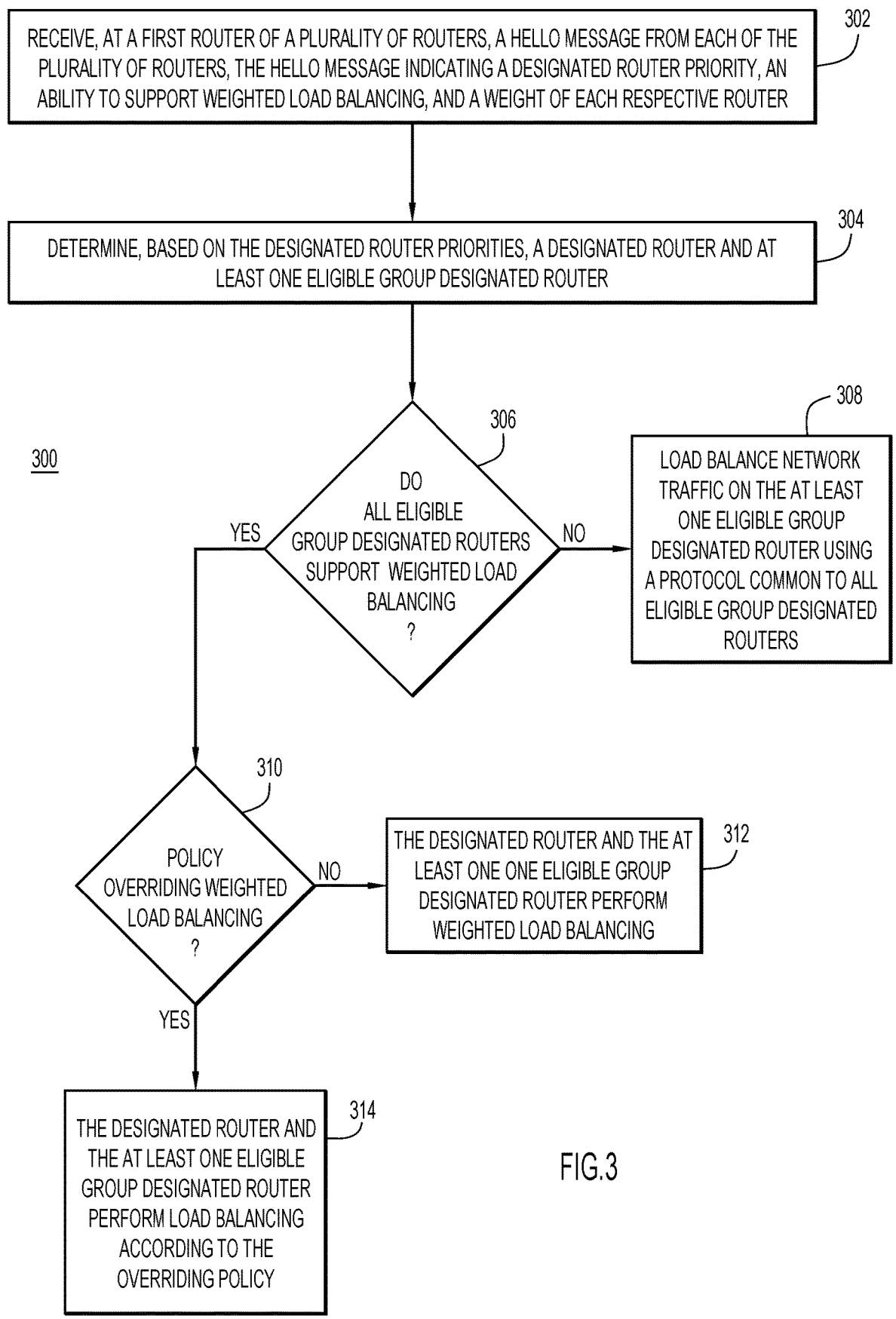
FIG. 3 is a flowchart depicting a method involving PIM weighted group designated router selection for weighted load balancing using one or more group designated routers, according to an example embodiment.

Turning to FIG. 3, and with continuing reference to FIGS. 1 and 2, shown is a flow diagram depicting a method 300 performed by the PIM weighted group designated router selection logic 110 for weighted load balancing using one or more group designated routers, according to an example embodiment.

At operation 302, a first router of a plurality of routers receives a first message from each of the other plurality of routers. The first message includes a designated router priority as well as a weight for each respective router, as described above in FIG. 2. The first message may also include an indication of an ability to support weighted load balancing. In one embodiment, the first message may be a PIM hello message. The PIM hello message may include the DRWLBC option. The DRWLBC option may include the weight of the router that provided the PIM hello message. The DRWLBC option may also include an algorithm type value. The algorithm type value may indicate if the router that provided the PIM hello message supports weighted PIM designated router load balancing.

At operation 304, each router determines, or elects, a designated router and at least one eligible group designated router, as described in detail above in operation 204 (see FIG. 2).

At operation 306, the designated router determines if all of the eligible designated routers support weighted load balancing. If all of the eligible designated routers do not support weighted load balancing, the method 300 proceeds to operation 308. However, if all of the eligible designated routers support weighted load balancing, the method 300 proceeds to operation 310.

At operation 308, the eligible group designated routers load balance the multicast network traffic using a protocol common to all eligible group designated routers. For example, the eligible group designated routers may use the load balancing techniques described in the PIM Designated Router Load Balancing IETF Draft. In other words, the multicast network traffic may be load balanced on the one or more eligible designated routers based on static, rather than dynamic, attributes, such as source IP address, Rendezvous Point IP address, etc.

At operation 310, each router determines whether there is a policy overriding weighted load balancing. For example, a user, such as a system administrator, may have configured the plurality of routers to prioritize load balancing based only on static attributes, as described in the PIM Designated Router Load Balancing IETF Draft. If no policy overriding the weighted load balancing techniques of this disclosure is implemented, the method 300 proceeds to operation 312. Otherwise, the method 300 proceeds to operation 314.

At operation 312, the designated router and the one or more eligible group designated routers perform weighted load balancing, as described above with reference to FIG. 2.

At operation 314, the designated router and the one or more eligible group designated routers perform load balancing according to the overriding policy. For example, the designated router and the one or more eligible group designated routers may load balance multicast network traffic flows according to the PIM Designated Router Load Balancing IETF Draft.

Figure 4:
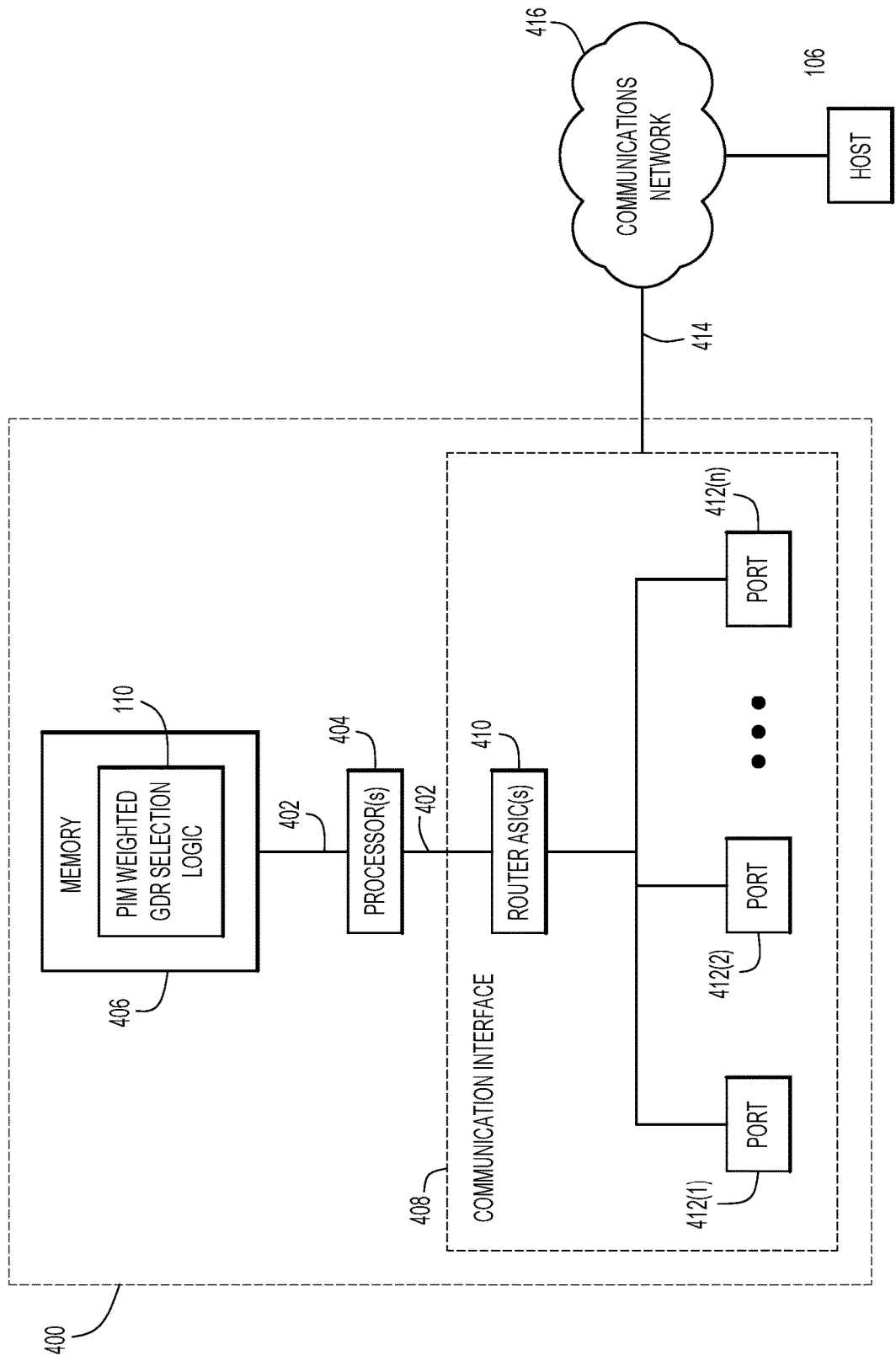
FIG. 4 is a block diagram showing a protocol independent multicast router configured to perform weighted load balancing, according to an example embodiment.

FIG. 4 is a block diagram showing a router 400, e.g., router 108(1), shown in FIG. 1, configured to perform weighted load balancing, according to example embodiments described herein. The router 400 includes a bus 402 or other communication mechanism for communicating information, and a processor 404 coupled with the bus 402 for processing the information. While the figure shows a single block 404 for a processor (e.g., microprocessor or microcontroller), it should be understood that the processor 404 represents a plurality of processing cores, each of which can perform separate processing. The router 400 also includes a main memory 406, such as a random access memory (RAM) or other dynamic storage device (e.g., dynamic RAM (DRAM), static RAM (SRAM), and synchronous DRAM (SD RAM)), coupled to the bus 402 for storing information and instructions to be executed by processor 404, such as the PIM weighted group designated router selection logic 110. In addition, the main memory 406 may be used for storing temporary variables or other intermediate information during the execution of instructions by the processor 404.

The main memory 406 may further include a read only memory (ROM) or other static storage device (e.g., programmable ROM (PROM), erasable PROM (EPROM), and electrically erasable PROM (EEPROM)) coupled to the bus 402 for storing static information and instructions for the processor 404.

The router 400 performs a portion or all of the processing steps of the process in response to the processor 404 executing one or more sequences of one or more instructions contained in a memory, such as the main memory 404. One or more processors in a multi-processing arrangement may also be employed to execute the sequences of instructions contained in main memory 406. In alternative embodiments, hard-wired circuitry may be used in place of or in combination with software instructions. Thus, embodiments are not limited to any specific combination of hardware circuitry and software.

Stored on any one or on a combination of non-transitory computer readable storage media, embodiments presented herein include software for controlling the router 400, for driving a device or devices for implementing the process, and for enabling the router 400 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The router 400 also includes a communication interface 408 coupled to the bus 402. The communication interface 408 provides a two-way data communication coupling to a network link 414 that is connected to, for example, a communications network 416 such as the Internet and ultimately to connect to a host shown generically at 106 in FIG. 4. For example, the communication interface 408 may be a wired or wireless network interface card having a plurality of ports 412(1)-412(n) configured to connect to any packet switched (wired or wireless) communications network 416. As another example, the communication interface 408 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 408 sends and receives electrical, electromagnetic or optical signals that carry digital data streams representing various types of information.

The communication interface 408 may also include special purpose logic devices 410 (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The network link 414 typically provides data communication through one or more networks to other data devices. For example, the network link 414 may provide a connection to another computer through a local area network or through equipment operated by a service provider, which provides communication services through communications network 416. The local network and the communications network 416 use, for example, electrical, electromagnetic, or optical signals that carry digital data streams, and the associated physical layer (e.g., CAT 5 cable, coaxial cable, optical fiber, etc.). The signals through the various networks and the signals on the network link 414 and through the communication interface 408, which carry the digital data to and from the router 400 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The router 400 can transmit and receive data, including program code, through the communications network 416, the network link 414 and the communication interface 408. Moreover, the network link 414 may provide a connection through the communications network 416 to a host 106 such as a personal computer, server, or cellular telephone.

Figure 5:
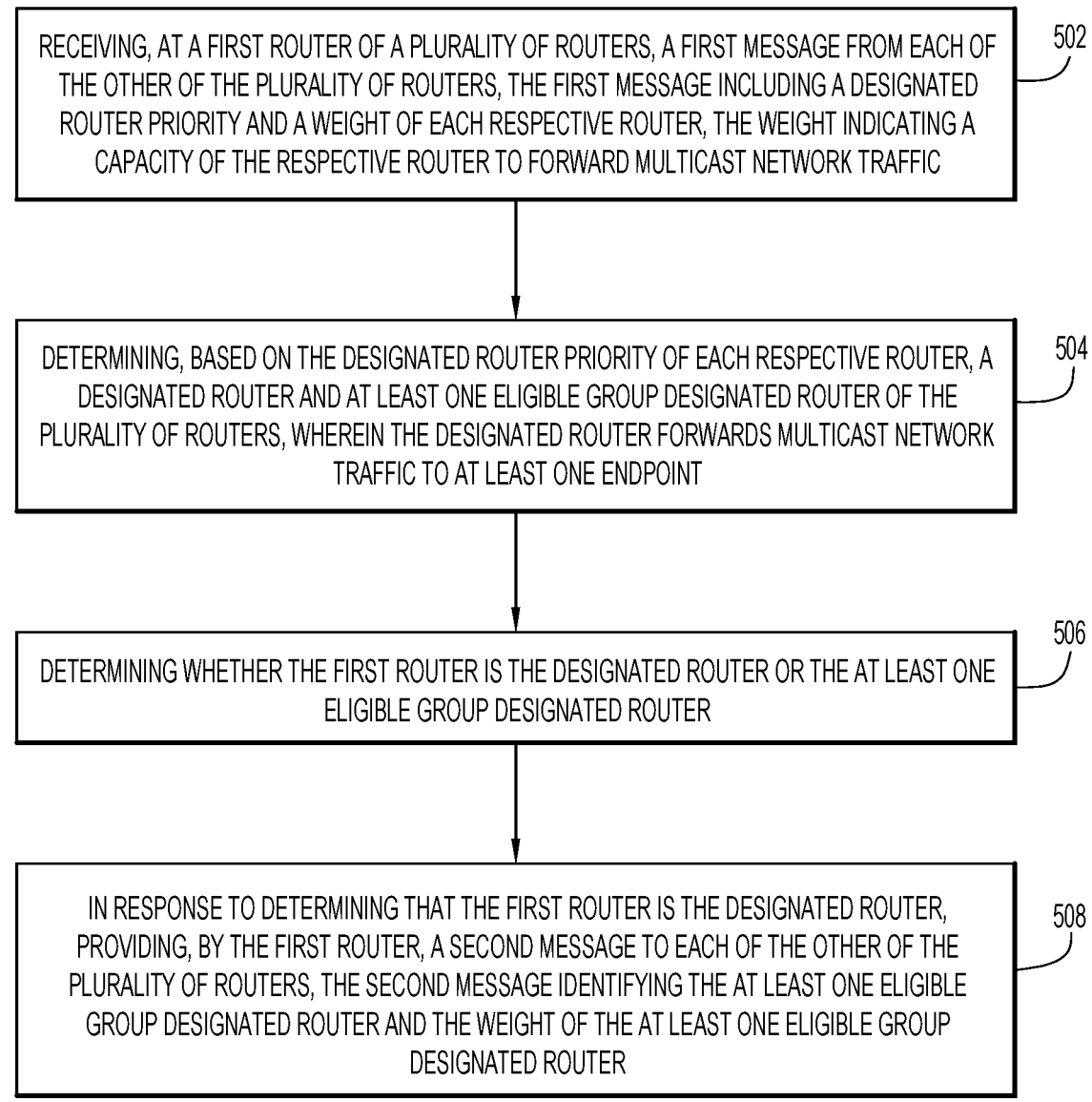
FIG. 5 is a flowchart depicting another method involving PIM weighted group designated router selection, according to an example embodiment.

Turning to FIG. 5, and with continuing reference to FIGS. 1 and 2, is a flowchart depicting a method 500 involving PIM weighted group designated router selection, according to an example embodiment. At operation 502, a first router of a plurality of routers receives a first message from each of the other of the plurality of routers. The first message may include the designated router priority and the weight of each respective router, as described above in connection with operation 202 in FIG. 2. For example, the first message may be a PIM hello message. The PIM hello message may include the PIM designated router weighted load balancing capability (DRWLBC) option. The DRWLBC option may include the weight of the router that provided the PIM hello message. The DRWLBC option may also include an algorithm type value, which may indicate whether the router that provided the PIM hello message supports the weighted PIM designated router load balancing techniques of this disclosure.

At operation 504, a designated router and at least one eligible group designated router of the plurality of routers are determined, as described above in connection with operation 204 in FIG. 2. For example, the designated router is elected based on the designated router priority of each respective router, as received in the first message at operation 502. The designated router is configured to forward multicast network traffic to at least one endpoint. In addition to determining the designated router, at least one eligible group designated router is also determined, also as described above in connection with operation 204 in FIG. 2.

At operation 506, the first router determines whether it is the designated router or the at least one eligible group designated router. For example, this determination may be based on the determination of each router in operation 504.

At operation 508, in response to determining that the first router is the designated router, the first router provides a second message to each of the other of the plurality of routers, as described in above in connection with operation 210 in FIG. 2. The second message identifies the at least one eligible group designated router as well as the weight for the at least one eligible group designated router. The at least one eligible group designated router may use this information to determine a number of multicast network flows it should route. Therefore, the method 500 provides a technique for load balancing multicast network traffic flows based on a weight of the at least one eligible group designated router.

In summary, in one example embodiment, a method is provided that includes receiving, at a first router of a plurality of routers, a first message from each of the other of the plurality of routers, the first message including a designated router priority and a weight of each respective router, the weight indicating a capacity of a respective router to forward multicast network traffic; determining, based on the designated router priority of each respective router, a designated router and at least one eligible group designated router of the plurality of routers, wherein the designated router forwards multicast network traffic to at least one endpoint; determining whether the first router is the designated router or the at least one eligible group designated router; in response to determining that the first router is the designated router, providing, by the first router, a second message to each of the other of the plurality of routers, the second message identifying the at least one eligible group designated router and the weight of the at least one eligible group designated router.

The first message may include a weighted load balancing capability option indicating a capability of the router to support weighted load balancing.

In another embodiment, the method also includes determining, based on the weighted load balancing capability option, whether the at least eligible group designated router does not support weighted load balancing; when the at least one eligible group designated router does not support weighted load balancing and the first router is the designated router: sending, by the first router, a third message to the plurality of routers identifying the at least one eligible group designated router; when the at least one eligible group designated router does not support weighted load balancing and when the first router is an eligible group designated router: receiving, by the first router, the third message from the designated router; and routing, by the first router, at least one multicast network traffic flow based on a hash function.

In another aspect, the number of multicast network traffic flows is further based on a hash function performed by the first router.

In yet another embodiment, the weight is based on at least one of a link load of the respective router; a processing load of the respective router; a pre-defined policy; or a link speed of the respective router. Further, the weight dynamically changes based on one or more of the link load of the respective router; the processing load of the respective router; the pre-defined policy; or the link speed of the respective router.

In another aspect, the weight indicates the respective router is capable of being the designated router but not capable of routing at least one multicast network traffic flow.

In another embodiment, an apparatus is provided including a communication interface including a plurality of ports configured to send and receive network communications; a processing device coupled with the communication interface, and configured to: receive a first message from each of a plurality of routers, the first message including a designated router priority and a weight of each respective router of the plurality of routers, the weight indicating a capacity of a respective router to forward multicast network traffic; determine, based on the designated router priority of each respective router, a designated router and at least one eligible group designated router of the plurality of routers, wherein the designated router forwards multicast network traffic to at least one endpoint; determine whether the first router is the designated router or the at least one eligible group designated router; in response to determining that the apparatus is the designated router: provide a second message to each of the other of the plurality of routers, the second message identifying the at least one eligible group designated router and the weight of the at least one eligible group designated router.

In yet another embodiment, one or more non-transitory computer readable storage media encoded with instructions that, when executed by a processor, cause the processor to: receive, at a first router of a plurality of routers, a first message from each of the other of the plurality of routers, the first message including a designated router priority and a weight of each respective router, the weight indicating a capacity of a respective router to forward multicast network traffic; determine, based on the designated router priority of each respective router, a designated router and at least one eligible group designated router of the plurality of routers, wherein the designated router forwards multicast network traffic to at least one endpoint; determining whether the first router is the designated router or the at least one eligible group designated router; in response to determining that the first router is the designated router, provide, by the first router, a second message to each of the other of the plurality of routers, the second message identifying the at least one eligible group designated router and the weight of the at least one eligible group designated router is disclosed.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
receiving, at a first router of a plurality of routers, a first message from each of the other of the plurality of routers, the first message including a designated router priority and a weighted load balancing capability option comprising a weight indicating a capacity of a respective router that provided the first message to forward multicast network traffic and an algorithm type value that indicates a capability of the respective router that provided the first message to support weighted load balancing of multicast network traffic;
determining, based on the designated router priority of each respective router, a designated router and at least one eligible group designated router of the plurality of routers that is not the designated router;
determining whether the first router is the designated router or the at least one eligible group designated router; and
determining whether the at least one eligible group designated router supports weighted load balancing based, at least in part, on the algorithm type value indicated for the weighted load balancing capability option for the at least one eligible group designated router; and
in response to determining that the first router is the designated router and that the at least one eligible group designated router supports weighted load balancing, performing weighted load balancing for routing multicast network traffic to at least one endpoint by at least one of the first router based on a weight of the first router and the at least one eligible group designated router based on a weight of the at least one eligible group designated router.

2. The method of claim 1, wherein a number of multicast network traffic flows that can be routed by the first router is based on a hash function of the weight of the first router, and wherein a number of multicast network traffic flows that can be routed by the at least one eligible group designated router is based on a hash function of the weight of the at least one eligible group designated router.

3. The method of claim 1, wherein a weight of a particular respective router of the plurality of routers is based on at least one of:
   a link load of the particular respective router;
   a processing load of the particular respective router;
   a pre-defined policy; or
   a link speed of the particular respective router.

4. The method of claim 3, wherein the weight dynamically changes based on changes of one or more of:
   the link load of the particular respective router;
   the processing load of the particular respective router;
   the pre-defined policy; or
   the link speed of the particular respective router.

5. The method of claim 1, wherein a weight of a particular respective router of the plurality of routers indicates that the particular respective router is eligible to be the designated router but will not participate in routing multicast network traffic.

6. The method of claim 1, further comprising:
   in response to determining that the first router is the designated router, providing, by the first router, a second message to each of the other of the plurality of routers, the second message identifying the at least one eligible group designated router and the weight of the at least one eligible group designated router.

7. The method of claim 6, wherein determining whether the at least one eligible group designated router supports weighted load balancing further includes confirming that no network policy overrides weighted load balancing for forwarding multicast network traffic.

8. The method of claim 6, wherein an algorithm type value of a particular respective router of the plurality of routers indicates that the particular respective router is capable of performing weighted load balancing of multicast network traffic but a weight of the particular respective router indicates the respective router is eligible to be the designated router but will not participate in routing multicast network traffic.

9. An apparatus comprising:
   a communication interface configured to send and receive network communications;
   a processing device coupled with the communication interface, and configured to:
   receive a first message from each of a plurality of routers, the first message including a designated router priority and a weighted load balancing capability option comprising a weight indicating a capacity of a respective router that provided the first message to forward multicast network traffic and an algorithm type value that indicates a capability of the respective router that provided the first message to support weighted load balancing of multicast network traffic;
   determine, based on the designated router priority of each respective router, a designated router and at least one eligible group designated router of the plurality of routers that is not the designated router;
   determine whether the apparatus is the designated router or the at least one eligible group designated router;
   determine whether the at least one eligible group designated router supports weighted load balancing based, at least in part, on the algorithm type value indicated for the weighted load balancing capability option for the at least one eligible group designated router; and
   in response to determining that the apparatus is the designated router and that the at least one eligible group designated router supports weighted load balancing, perform weighted load balancing for routing multicast network traffic to at least one endpoint by at least one of the apparatus based on a weight of the apparatus and the at least one eligible group designated router based on a weight of the at least one eligible group designated router.

10. The apparatus of claim 9, wherein a number of multicast network traffic flows that can be routed by the apparatus is based on a hash function of the weight of the apparatus, and wherein a number of multicast network traffic flows that can be routed by the at least one eligible group designated router is based on a hash function of the weight of the at least one eligible group designated router.

11. The apparatus of claim 9, wherein a weight of a particular respective router of the plurality of routers is based on at least one of:
   a link load of the particular respective router;
   a processing load of the particular respective router;
   a pre-defined policy; or
   a link speed of the particular respective router.

12. The apparatus of claim 11, wherein the weight dynamically changes based on changes of one or more of:
   the link load of the particular respective router;
   the processing load of the particular respective router;
   the pre-defined policy; or
   the link speed of the particular respective router.

13. The apparatus of claim 9, wherein a weight of a respective router of the plurality of routers indicates that the respective router is eligible to be the designated router but will not participate in routing multicast network traffic.

14. One or more non-transitory computer readable storage media encoded with instructions that, when executed by a processor, cause the processor to:
   receive, at a first router of a plurality of routers, a first message from each of the other of the plurality of routers, the first message including a designated router priority and a weighted load balancing capability option comprising a weight indicating a capacity of a respective router that provided the first message to forward multicast network traffic and an algorithm type value that indicates a capability of the respective router that provided the first message to support weighted load balancing of multicast network traffic;
   determine, based on the designated router priority of each respective router, a designated router and at least one eligible group designated router of the plurality of routers that is not the designated router;
   determine whether the first router is the designated router or the at least one eligible group designated router;
   determine whether the at least one eligible group designated router supports weighted load balancing based, at least in part, on the algorithm type value indicated for the weighted load balancing capability option for the at least one eligible group designated router; and
   in response to determining that the first router is the designated router and that the at least one eligible group designated router supports weighted load balancing, perform weighted load balancing for routing multicast network traffic to at least one endpoint by at least one of the first router based on a weight of the first router and the at least one eligible group designated router based on a weight of the at least one eligible group designated router.

15. The computer readable storage media of claim 14, wherein a number of multicast network traffic flows that can be routed by the first router is based on a hash function of the weight of the first router, and wherein a number of multicast network traffic flows that can be routed by the at least one eligible group designated router is based on a hash function of the weight of the at least one eligible group designated router.

16. The computer readable storage media of claim 14, wherein a weight of a particular respective router of the plurality of routers is based on at least one of:
   a link load of the particular respective router;
   a processing load of the particular respective router;
   a pre-defined policy; or
   a link speed of the particular respective router.

17. The computer readable storage media of claim 16, wherein the weight dynamically changes based on changes of one or more of:
   the link load of the particular respective router;
   the processing load of the particular respective router;
   the pre-defined policy; or
   the link speed of the particular respective router.

18. The computer readable storage media of claim 14, wherein the instructions further cause the processor to:
   in response to determining that the first router is the designated router, provide, by the first router, a second message to each of the other of the plurality of routers, the second message identifying the at least one eligible group designated router and the weight of the at least one eligible group designated router.

19. The computer readable storage media of claim 14, wherein determining whether the at least one eligible group designated router supports weighted load balancing further includes confirming that no network policy overrides weighted load balancing for forwarding multicast network traffic.

20. The computer readable storage media of claim 14, wherein an algorithm type value of a particular respective router of the plurality of routers indicates that the particular respective router is capable of performing weighted load balancing of multicast network traffic but a weight of the particular respective router indicates the respective router is eligible to be the designated router but will not participate in routing multicast network traffic.

* * * * *